United States Patent
Yamasawa et al.

(10) Patent No.: US 10,780,718 B2
(45) Date of Patent: Sep. 22, 2020

(54) LIQUID DISCHARGE APPARATUS AND LIQUID DISCHARGE METHOD

(71) Applicants: Aya Yamasawa, Tokyo (JP); Manabu Arita, Kanagawa (JP); Toshihito Kamei, Tokyo (JP); Shinichi Hatanaka, Tokyo (JP)

(72) Inventors: Aya Yamasawa, Tokyo (JP); Manabu Arita, Kanagawa (JP); Toshihito Kamei, Tokyo (JP); Shinichi Hatanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/358,165

(22) Filed: Mar. 19, 2019

(65) Prior Publication Data

US 2019/0299659 A1    Oct. 3, 2019

(30) Foreign Application Priority Data

Mar. 30, 2018 (JP) .................................. 2018-068467

(51) Int. Cl.
*B41J 11/00* (2006.01)
*B29C 64/112* (2017.01)
(Continued)

(52) U.S. Cl.
CPC ........... *B41J 11/002* (2013.01); *B29C 64/112* (2017.08); *B29C 64/393* (2017.08); *B41J 2/01* (2013.01); *G01B 11/30* (2013.01)

(58) Field of Classification Search
CPC ......... B41J 11/002; B41J 2/01; B29C 64/112; B29C 64/393; G01B 11/30
(Continued)

(56) References Cited

U.S. PATENT DOCUMENTS

| 2009/0225143 A1 | 9/2009 | Fukui |
| 2015/0306891 A1 | 10/2015 | Sohgawa et al. |

(Continued)

FOREIGN PATENT DOCUMENTS

| AP | 2016-128254 | 7/2016 |
| EP | 2 481 599 A1 | 8/2012 |

(Continued)

OTHER PUBLICATIONS

Extended European Search Report dated Aug. 5, 2019 in corresponding European Patent Application No. 19163928.5, 8 pages.

*Primary Examiner* — Huan H Tran
*Assistant Examiner* — Alexander D Shenderov
(74) *Attorney, Agent, or Firm* — Oblon, McClelland, Maier & Neustadt, L.L.P.

(57) ABSTRACT

A liquid discharge apparatus includes a liquid discharge device, circuitry, and a curing device. The liquid discharge device is configured to discharge a liquid having a curing degree variable by a stimulation amount while relatively moving to a recording medium. The circuitry is configured to acquire surface roughness information indicating glossiness of a formed object formed on the recording medium and set a stimulation amount for the liquid based on the surface roughness information. The curing device is configured to stimulate the liquid discharged by the liquid discharge device based on the stimulation amount set by the circuitry to cure the liquid. The circuitry is configured to set, based on the surface roughness information, the stimulation amount for each region stimulated by the curing device in a same plane of the formed object.

9 Claims, 5 Drawing Sheets

(51) Int. Cl.
  *B29C 64/393* (2017.01)
  *B41J 2/01* (2006.01)
  *G01B 11/30* (2006.01)

(58) Field of Classification Search
  USPC .......................................................... 347/102
  See application file for complete search history.

(56) References Cited

U.S. PATENT DOCUMENTS

| | | | |
|---|---|---|---|
| 2015/0328908 A1 | 11/2015 | Hatanaka | |
| 2016/0193858 A1 | 7/2016 | Tsuchiya | |
| 2016/0267365 A1* | 9/2016 | Totsuka | H04N 1/52 |
| 2016/0335781 A1* | 11/2016 | Sano | B41J 3/407 |
| 2017/0120520 A1* | 5/2017 | Miller | B33Y 10/00 |
| 2017/0210145 A1 | 7/2017 | Kubo | |

FOREIGN PATENT DOCUMENTS

| | | |
|---|---|---|
| EP | 2 481 601 A1 | 8/2012 |
| JP | 2012-183707 | 9/2012 |
| JP | 2012-232529 | 11/2012 |
| JP | 2013-059868 | 4/2013 |
| JP | 2014-069496 | 4/2014 |
| JP | 2015-208927 | 11/2015 |
| JP | 2016-049658 | 4/2016 |
| JP | 2017-105091 | 6/2017 |
| JP | 2017-115105 | 6/2017 |
| JP | 2017-124548 | 7/2017 |
| JP | 2017-213711 | 12/2017 |

\* cited by examiner

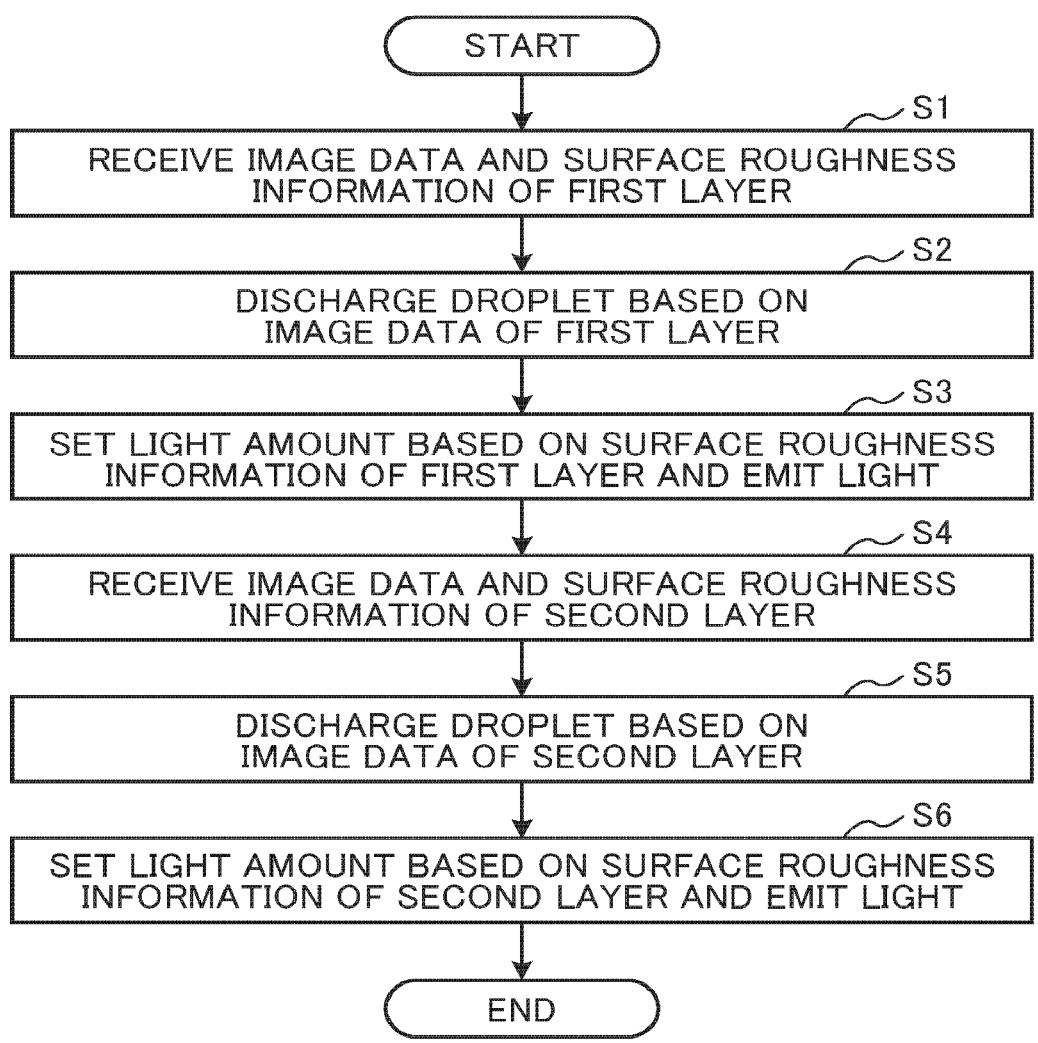

LIQUID DISCHARGE APPARATUS AND LIQUID DISCHARGE METHOD

CROSS-REFERENCE TO RELATED APPLICATION

The patent invention is based on and claims priority pursuant to 35 U.S.C. § 119(a) to Japanese Patent Application No. 2018-068467, filed on Mar. 30, 2018, in the Japan Patent Office, the entire disclosure of which is hereby incorporated by reference herein.

BACKGROUND

Technical Field

The present disclosure relates to a liquid discharge apparatus and a liquid discharge method.

Discussion of the Background Art

A known image forming method (such as a three-dimensional object forming method) forms a three-dimensional image or a three-dimensional object by laminating layers formed by discharging an ink and drying or curing the ink. Hereinafter, a "formed object" includes a three-dimensional image and a three-dimensional object.

According to this method, for example, a photocurable ink (for example, a ultraviolet (UV) ink) to be cured by irradiation with light such as an ultraviolet ray (UV) is discharged onto a medium (image-formed object), a UV ink dot on the medium is irradiated with light and cured, and the UV ink dot is thereby fixed onto the medium to form a formed object.

SUMMARY

At least one aspect of this disclosure provides a liquid discharge apparatus including a liquid discharge device, circuitry, and a curing device. The liquid discharge device is configured to discharge a liquid having a curing degree variable by a stimulation amount while relatively moving with respect to a recording medium. The circuitry is configured to acquire surface roughness information indicating glossiness of a formed object formed on the recording medium and set a stimulation amount for the liquid based on the surface roughness information. The curing device is configured to stimulate the liquid discharged by the liquid discharge device based on the stimulation amount set by the circuitry to cure the liquid. The circuitry is configured to set, based on the surface roughness information, the stimulation amount for each region stimulated by the curing device in a same plane of the formed object.

Further, at least one aspect of this disclosure provides a liquid discharge method to be executed by a liquid discharge apparatus and including discharging a liquid having a curing degree variable by a stimulation amount while relatively moving with respect to a recording medium, acquiring surface roughness information indicating glossiness of a formed object formed on the recording medium, setting a stimulation amount for the liquid based on the surface roughness information, and stimulating the liquid discharged by the discharging based on the stimulation amount set by the setting to cure the liquid. The setting sets, based on the surface roughness information, the stimulation amount for each region to be stimulated by the curing in a same plane of the formed object.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a flowchart schematically illustrating a flow of an image forming process.

Figure 1:
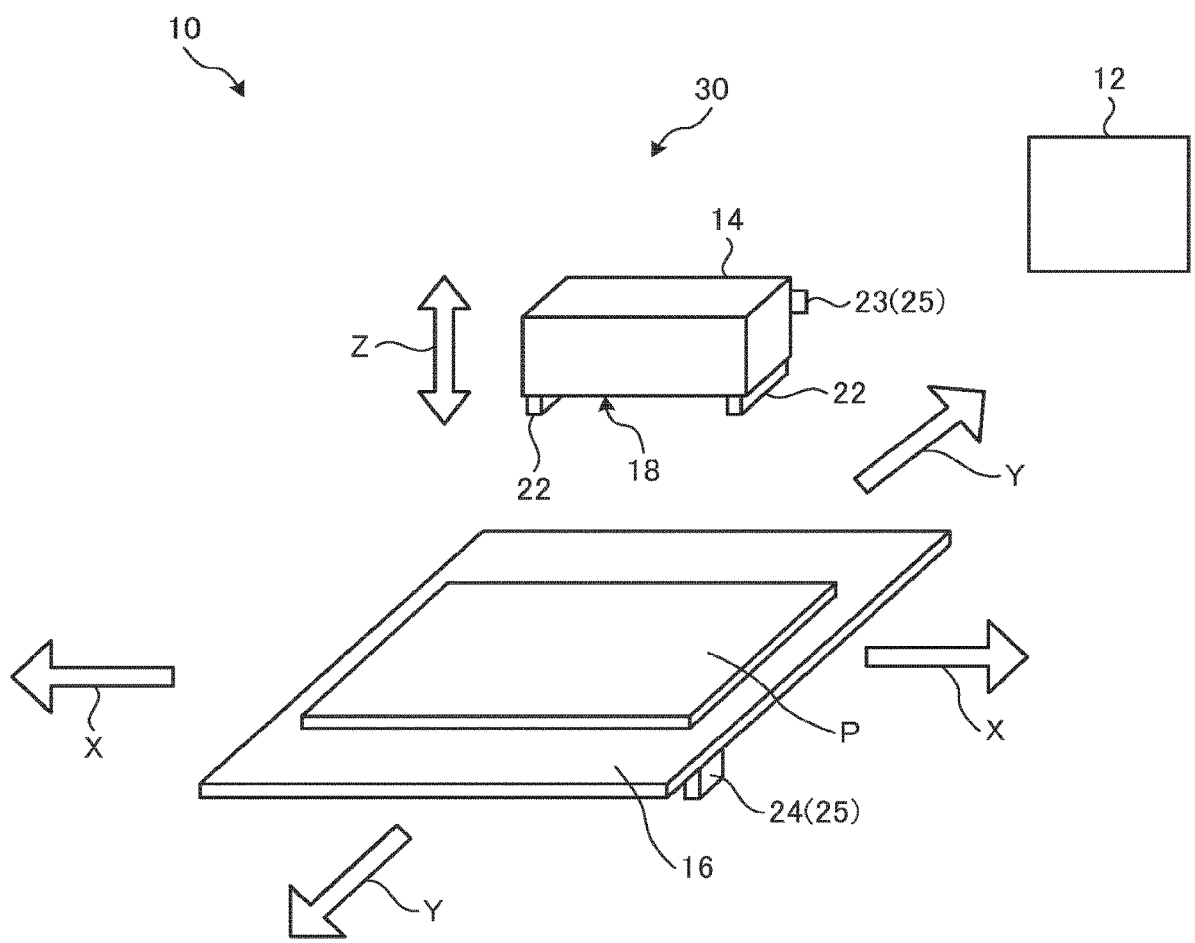
FIG. 1 is a schematic configuration diagram illustrating an example of an image processing system according to an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a liquid discharge apparatus and a liquid discharge method will be described in detail with reference to the attached drawings.

Here, FIG. 1 is a schematic configuration diagram illustrating an example of an image processing system 10 according to an embodiment. The image processing system 10 includes an image processing apparatus 12 and an image forming apparatus 30. The image processing apparatus 12 and the image forming apparatus 30 are communicably connected to each other. It is to be noted that a "liquid discharge apparatus" in a broad sense includes any of the image processing system 10 including the image processing apparatus 12 and the image forming apparatus 30, the image processing apparatus 12 alone, and the image forming apparatus 30 alone.

The image forming apparatus 30 includes a liquid discharge device 14, a movable stage 16, and a driving device 25. The liquid discharge device 14 is an inkjet system carriage including a plurality of heads 18 (recording heads) provided with a plurality of nozzles, and discharges a droplet from each of nozzles of the heads 18 to record a dot. The nozzles are disposed on a surface of the liquid discharge device 14 facing the movable stage 16.

The droplet includes an ink droplet and an additional droplet. The ink droplet is a droplet of an ink including a coloring material used for image formation (color ink).

The additional droplet is a droplet of a color not affecting an image. The additional droplet is, for example, white or transparent (clear ink). The additional droplet may have a similar color to the color of a support P which is an image-formed object. The support P is an image-formed object of an image formed by the ink droplet. The support P is, for example, a recording medium. By discharging a droplet using an inkjet system or the like, the support P itself may be formed on the movable stage 16.

The ink droplet and the additional droplet have stimulation-curability. The stimulation is, for example, light (ultraviolet ray, infrared ray, or the like), heat, or electricity. In the present embodiment, as an example, a case where the ink droplet and the additional droplet are ultraviolet-curable will be described. Note that the ink droplet and the additional droplet are not limited to the ultraviolet-curable form.

An irradiation device 22 is disposed on a surface of the liquid discharge device 14 facing the movable stage 16. The irradiation device 22 that functions as a curing device irradiates the support P with light having a wavelength for curing an ink droplet and an additional droplet discharged from the nozzles. The irradiation device 22 includes, for example, an ultraviolet light-emitting diode (UV-LED), and emits an ultraviolet ray.

The irradiation device 22 according to the present embodiment makes the light amount (stimulation amount) of the LED variable, for example, using a pulse width modulation (PWM) system.

The movable stage 16 holds the support P. The driving device 25 relatively moves the liquid discharge device 14 and the movable stage 16 in a vertical direction Z (in the direction of the arrow Z in FIG. 1), a main scanning direction X perpendicular to the vertical direction Z, and a sub-scanning direction Y perpendicular to the vertical direction Z and the main scanning direction X. In the present embodiment, a plane including the main scanning direction X and the sub-scanning direction Y corresponds to an XY plane along a surface of the movable stage 16 facing the liquid discharge device 14.

The driving device 25 includes a first driving device 23 and a second driving device 24. The first driving device 23 moves the liquid discharge device 14 in the vertical direction Z, the main scanning direction X, and the sub-scanning direction Y. The second driving device 24 moves the movable stage 16 in the vertical direction Z, the main scanning direction X, and the sub-scanning direction Y. Note that the image forming apparatus 30 may include either one of the first driving device 23 and the second driving device 24.

With such a configuration, the image forming apparatus 30 discharges an ultraviolet-curable droplet onto a predetermined region corresponding to image data, irradiate the droplet with an ultraviolet ray to cure the droplet, and sequentially laminates the droplets to perform three-dimensional modeling. More specifically, for example, the image forming apparatus 30 repeats a step of discharging an ultraviolet-curable droplet from the nozzle of the head 18 onto a predetermined region corresponding to image data on the support P, then irradiating the droplet with an ultraviolet ray from the adjacent irradiation device 22 to cure the droplet to form a first layer, then discharging an ultraviolet-curable droplet from the nozzle of the head 18 onto a predetermined region corresponding to image data, and irradiating the droplet with an ultraviolet ray from the adjacent irradiation device 22 to cure the droplet to form a second layer while lowering the movable stage 16 in accordance with the number of lamination, and thereby forms a three-dimensional formed object (protrusion).

Here, an ultraviolet-curable composition constituting the ultraviolet-curable ink will be exemplified. The ultraviolet-curable composition according to the present embodiment contains at least two monomers, a polymerization initiator, and an ultraviolet absorber. The at least two monomers include a monofunctional monomer and a polyfunctional monomer. The content of the polyfunctional monomer is 40% by mass or more with respect to the total amount of the monomers. It is to be noted that the ultraviolet-curable composition further contains a coloring material, an organic solvent, and other components, if necessary.

For example, an ultraviolet-curable composition is applied onto the support P and irradiated with an ultraviolet ray having a wavelength of 395 nm, an illuminance of 2.5 W/cm$^2$, and an irradiation dose of 1,000 mJ/cm$^2$ to be cured. As for a formed object having an average film thickness of 40 μm thus formed, a ratio between a minimum value and a maximum value (minimum value/maximum value) in measurement of depth up to Martens hardness of 5.0 μm using a micro hardness meter is larger than 0.55.

In the ultraviolet-curable composition as described above, the hardness of a surface of a formed object varies depending on the irradiation light amount of the irradiation device 22. For example, in a case where an ultraviolet ray having a wavelength of 395 nm and an illuminance of 2.5 W/cm$^2$ is emitted, the hardness of a surface of a formed object at an irradiation dose of 300 mJ/cm$^2$ is lower than that an irradiation dose of 1,000 mJ/cm$^2$. That is, the ink which is an ultraviolet-curable composition according to the present embodiment is a liquid having a curing degree variable by the light amount (stimulation amount) of an ultraviolet ray.

Figure 2:
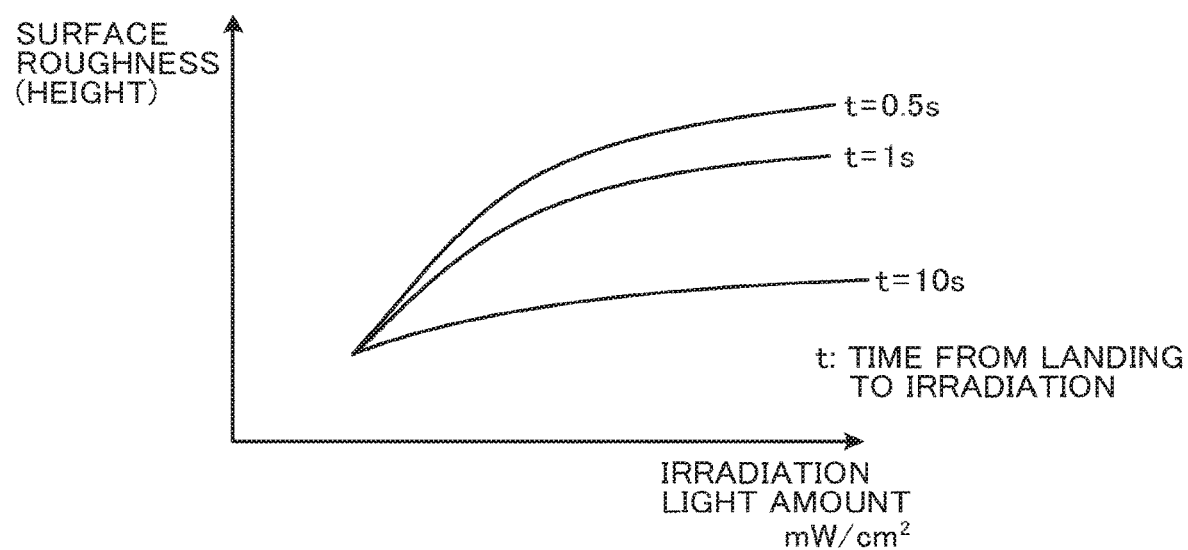
FIG. 2 is a graph illustrating an example of a relationship between an irradiation light amount of a first layer and surface roughness of a second layer.
Figure 3A:
FIGS. 3A and 3B are diagrams illustrating a difference in a lamination state according to the irradiation light amount.
Figure 3B:

Here, FIG. 2 is a graph illustrating an example of a relationship between the irradiation light amount of a first layer and surface roughness of a second layer, and FIGS. 3A and 3B are diagrams illustrating a difference in a lamination state according to the irradiation light amount. FIG. 3A illustrates a case where the irradiation light amount of an ultraviolet ray by the irradiation device 22 is large, and FIG. 3B illustrates a case where the irradiation light amount of an ultraviolet ray by the irradiation device 22 is small.

As described above, in the ultraviolet-curable composition according to the present embodiment, if the irradiation light amount of an ultraviolet ray by the irradiation device 22 is small, the hardness of a surface of a formed object is low. Therefore, as illustrated in FIG. 3B, in a case where the irradiation light amount of an ultraviolet ray by the irradiation device 22 with respect to an ink droplet or an additional droplet in the first layer is small, surface tension of a formed object of the droplet or the additional droplet in the first layer is small. Therefore, an ink droplet or an additional droplet in the second layer spreads in a wet state. That is, as illustrated in FIG. 3A, in a case where the irradiation light amount of an ultraviolet ray by the irradiation device 22 is large, the height of a three-dimensional formed object is high. Therefore, surface roughness is increased, and a surface of the three-dimensional formed object is mat. Meanwhile, as illustrated in FIG. 3B, in a case where the irradiation light amount of an ultraviolet ray by the irradiation device 22 is small, the height of a three-dimensional object is low, and glossiness is increased. Therefore, surface roughness is reduced, and a surface of the three-dimensional formed object is glossy.

That is, as illustrated in FIG. 2, surface roughness (=height) per unit area of an irradiation region of the second layer increases as the irradiation light amount of an ultraviolet ray by the irradiation device 22 in the first layer increases. As illustrated in FIG. 2, the above-described tendency is more significant as time from landing of an ink droplet or an additional droplet to irradiation is shorter.

Next, the hardware configuration of the image processing apparatus 12 will be described.

Figure 4:
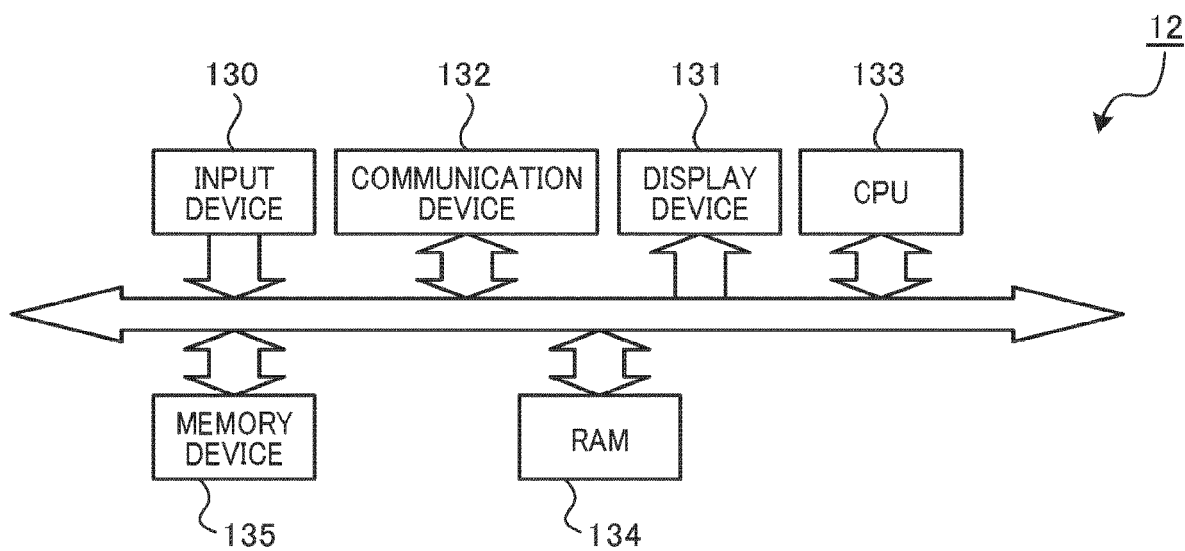
FIG. 4 is a block diagram illustrating an example of a hardware configuration of an image processing apparatus.

FIG. 4 is a block diagram illustrating an example of the hardware configuration of the image processing apparatus 12.

The image processing apparatus 12 includes an input device 130 for inputting data, a display device 131 such as a display, a communication device 132 for performing data communication, a central processing unit (CPU) 133 as a controller for controlling the entire apparatus, a random access memory (RAM) 134 used as a work area of the CPU 133, and a memory device 135 storing various programs and the like for operating the CPU 133.

Examples of the input device 130 include a keyboard including a cursor key, a numeric input key, and various function keys, and further include a mouse and a slice pad for selecting a key on a display screen of the display device 131. The input device 130 is a user interface for a user to give an operation instruction to the CPU 133 or to input data.

Examples of the display device 131 include a cathode ray tube (CRT) and a liquid crystal display (LCD), and the display device 131 performs display corresponding to display data input from the CPU 133. The communication device 132 is for data communication with the outside, and is for performing data communication with the image forming apparatus 30 through a predetermined communication interface.

The CPU 133 is a central control unit for controlling the entire apparatus according to a program stored in the memory device 135. The input device 130, the display device 131, the communication device 132, the RAM 134, and the memory device 135 are connected to the CPU 133. The CPU 133 controls data communication, reading of an application program by access to a memory, reading/writing of various kinds of data, data/command Input, display, and the like.

The CPU 133 also transmits image data for forming an image based on image data input from the input device 130 and image data stored in the memory device 135 to the image forming apparatus 30 via the communication device 132.

The RAM 134 includes a work memory for storing a specified program, an input instruction, input data, a processing result, and the like, and a display memory for temporarily storing display data to be displayed on a display screen of the display device 131.

The memory device 135 stores various programs and data such as an OS program executable by the CPU 133 (for example, Microsoft's operating system Windows (registered trademark)) and a printer driver corresponding to the image forming apparatus 30. Note that examples of the memory device 135 include an optical, magnetic, and electrical recording media such as a hard disk, CD-ROM, and DVD-ROM.

Various programs are stored in the memory device 135 in a data form readable by the CPU 133. The various programs may be recorded in the memory device 135 in advance or may be downloaded via a communication line such as the Internet and stored in the memory device 135.

A program executed by the image processing apparatus 12 according to the present embodiment has a module configuration including the following functions. The CPU 133 of the image processing apparatus 12 reads a program from the memory device 135 or the like and executes the program. As a result, each module is loaded on the RAM 134, and the functions are exhibited.

Figure 5:
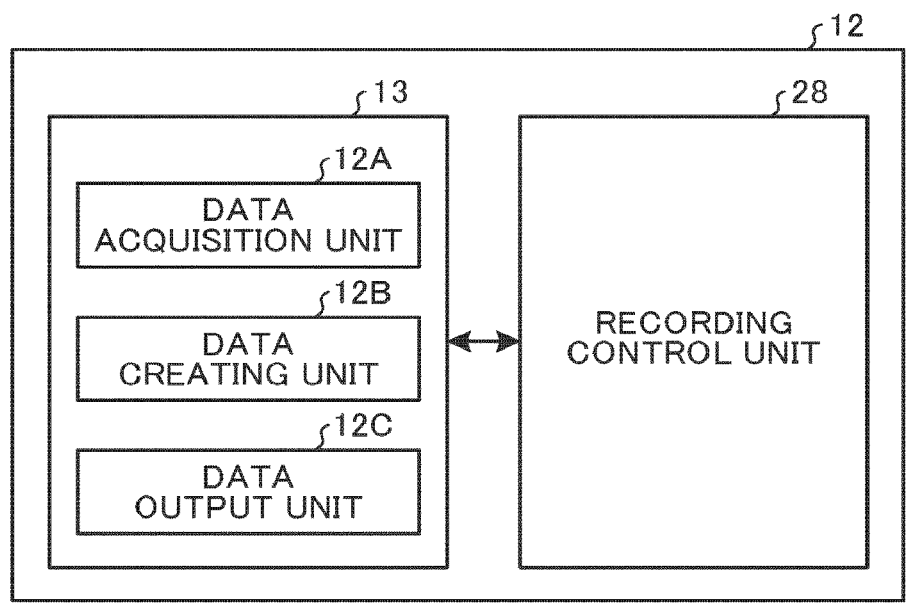
FIG. 5 is a block diagram illustrating a functional configuration of the image processing apparatus.

FIG. 5 is a block diagram illustrating a functional configuration of the image processing apparatus 12.

The image processing apparatus 12 includes a main control unit 13 and a recording control unit 28. The main control unit 13 includes a data acquisition unit 12A, a data creating unit 12B, and a data output unit 12C.

It is to be noted that, in the present embodiment, the data acquisition unit 12A, the data creating unit 12B, the data output unit 12C, and the recording control unit 28, which function as circuitry, are achieved by software, but the present disclosure is not limited thereto. A part or all of the data acquisition unit 12A, the data creating unit 12B, the data output unit 12C, and the recording control unit 28 may be achieved by hardware such as an integrated circuit (IC), or may be achieved by using both software and hardware.

The data acquisition unit 12A is an acquisition unit for acquiring image data and surface roughness information. The image data is information regarding the shape or color of an image to be formed. The surface roughness information indicates surface roughness (=height) per unit area (irradiation region of an ultraviolet ray by the irradiation device 22) of a formed object formed on the support P by a droplet (ink). The surface roughness information may be information expressed by glossiness or smoothness.

Note that the data acquisition unit 12A may acquire the image data and the surface roughness information from an external device via the communication device 132 or may acquire the image data and the surface roughness from the memory device 135 disposed in the image processing apparatus 12.

The data creating unit 12B performs predetermined data processing such as mask processing on the image data and the surface roughness information acquired by the data acquisition unit 12A.

The data output unit 12C outputs the image data and the surface roughness information created by the data creating unit 12B to the image forming apparatus 30.

The recording control unit 28 controls the liquid discharge device 14 and the driving device 25 of the image forming apparatus 30 so as to discharge a droplet 32 (see FIG. 6) corresponding to each pixel from the head 18 based on the image data created by the data output unit 12C.

The recording control unit 28 functioning as a stimulation-amount setting unit controls the irradiation device 22 based on the surface roughness information. More particularly, the recording control unit 28 sets the light amount of an ultraviolet ray to be emitted for each irradiation region (unit area of a formed object formed on the support P) of the irradiation device 22 based on the surface roughness information. The recording control unit 28 includes, for example, a table in which the surface roughness information and the light amount of an ultraviolet ray are associated with each other.

It is to be noted that, in the present embodiment, the image processing system 10 includes the image processing apparatus 12 and the image forming apparatus 30 that are communicably connected. However, the image processing apparatus 12 may be included in the image forming apparatus 30.

In the configuration in which the image processing system 10 includes the image processing apparatus 12 and the image forming apparatus 30, the image forming apparatus 30 may include the recording control unit 28, and the recording control unit 28 may accept image data from the data output unit 12C of the image processing apparatus 12.

Next, the details of the image forming apparatus 30 will be described. The image forming apparatus 30 discharges an ink which is an ultraviolet-curable composition and forms an image by an optical modeling method for curing the ultraviolet-curable composition by irradiation with light.

Figure 6:
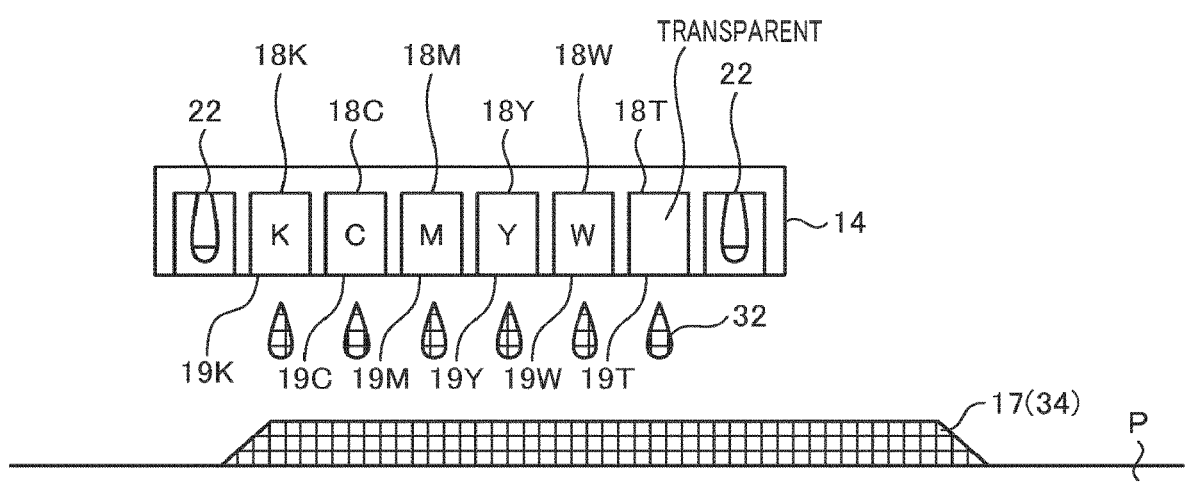
FIG. 6 is a schematic diagram illustrating an example of a liquid discharge device of an image forming apparatus.

FIG. 6 is a schematic diagram illustrating an example of the liquid discharge device 14 of the image forming apparatus 30. As illustrated in FIG. 6, the liquid discharge device 14 in the image forming apparatus 30 is a carriage on which a plurality of nozzles 19 is arranged in a predetermined direction. Each of the nozzles 19 discharges an ink droplet, an additional droplet, or a mixed liquid of the ink droplet and the additional droplet as the droplet 32. The nozzles 19 and the configuration for discharging a droplet are similar to those of a known inkjet system.

In the present embodiment, heads 18K, 18C, 18M, 18Y, 18W, and 18T (referred to as heads 18 when these heads are not distinguished from each other) are arranged in a predetermined direction. The heads 18 include nozzles 19K, 19C, 19M, 19Y, 19W, and 19T (referred to as nozzles 19 when these nozzles are not distinguished from each other) for discharging ink droplets, respectively. The nozzle 19K discharges a black ink droplet, the nozzle 19C discharges a cyan ink droplet, the nozzle 19M discharges a magenta ink droplet, the nozzle 19Y discharges a yellow ink droplet, the nozzle 19W discharges a white additional droplet, and the nozzle 19T discharges a transparent additional droplet.

By discharging the droplet 32 from the nozzle 19, a dot 34 corresponding to the droplet 32 is formed on the support P, and an image 17 is formed. The droplets 32 are laminated and discharged, and the dots 34 are thereby laminated to form the three-dimensional image 17 as a formed object.

In a known technique, time from landing of a droplet to curing thereof is controlled. Therefore, a printing speed is limited, and productivity is reduced disadvantageously.

By contrast, in the present embodiment, the irradiation devices 22 are disposed at both ends in an arrangement direction of the heads 18K, 18C, 18M, 18Y, 18W, and 18T. The droplet 32 discharged from each of the nozzles 19 is irradiated with ultraviolet light by the irradiation device 22, and the droplet 32 is thereby cured.

The irradiation device 22 is preferably disposed in the vicinity of the nozzle 19. By disposing the irradiation device 22 in the vicinity of the nozzle 19, it is possible to shorten curing time from attachment of the droplet 32 discharged from the nozzle 19 to a side of the support P to curing of the droplet 32. Therefore, it is possible to form a higher definition image. Note that the number of the irradiation devices 22 and the installation positions of the irradiation devices 22 are not limited to the form illustrated in FIG. 6.

According to the known technique, a plurality of inks having different values of curability is used, and therefore a large-sized apparatus is required disadvantageously.

FIG. 6 illustrates a case where each of the heads 18 discharges one color (one type) of liquid droplet 32, but the present disclosure is not limited thereto. For example, each of the heads 18 may include two or more nozzles 19. The nozzle 19 may discharge a mixed droplet of a plurality of types of droplets 32. The color of an ink discharged from the liquid discharge device 14 is not limited to black, cyan, magenta, and yellow. The types of the droplet 32 discharged from the liquid discharge device 14 is not limited to six types (black, cyan, magenta, yellow, white, and transparent).

As illustrated in FIG. 1, by relatively moving the liquid discharge device 14 and the support P while discharging the droplet 32 from the nozzle 19 of the liquid discharge device 14, the image forming apparatus 30 can form the dot 34 with the droplet 32 on the support P or laminate the dots 34.

Note that the support P may have a planar shape or a three-dimensional shape with irregularities or the like. The support P may be any of paper, coated paper, cardboard, OHP, a plastic film, prepreg, copper foil, polycarbonate, metal, glass, and the like.

The flow of an image forming process by the image forming apparatus 30 will be described. The image forming apparatus 30 according to the present embodiment sets the light amount of an ultraviolet ray to be emitted for each irradiation region of the irradiation device 22 based on surface roughness information under control of the recording control unit 28, and can thereby properly control surface roughness for each region that can be irradiated with the ultraviolet ray by the irradiation device 22 in the same plane of a three-dimensional formed object with a simpler configuration.

FIG. 7 is a flowchart schematically illustrating the flow of the image forming process.

As illustrated in FIG. 7, first, the recording control unit 28 receives image data and surface roughness information of a first layer output from the data output unit 12C of the image processing apparatus 12 (step S1).

Subsequently, the recording control unit 28 controls the liquid discharge device 14 and the driving device 25 of the image forming apparatus 30 so as to discharge the droplet 32 corresponding to each pixel from the head 18 based on the image data of the first layer (step S2).

In addition, the recording control unit 28 sets the light amount of an ultraviolet ray to be emitted for each irradiation region (unit area of a formed object formed on the support P) of the irradiation device 22 based on the surface roughness information of the first layer and controls the irradiation device 22 (step S3).

Subsequently, the recording control unit 28 receives image data and surface roughness information of a second layer output from the data output unit 12C of the image processing apparatus 12 (step S4).

Subsequently, the recording control unit 28 controls the liquid discharge device 14 and the driving device 25 of the image forming apparatus 30 so as to discharge the droplet 32 corresponding to each pixel from the head 18 based on the image data of the second layer (step S5).

In addition, the recording control unit 28 sets the light amount of an ultraviolet ray to be emitted for each irradiation region (unit area of a formed object formed on the support P) of the irradiation device 22 based on the surface roughness information of the second layer and controls the irradiation device 22 (step S6).

It is to be noted that, in the present embodiment, lamination up to the second layer has been described with reference to the flowchart of FIG. 7, but the present disclosure is not limited thereto, and the number of lamination is arbitrary.

According to the known technique, a mode for mat printing and gloss printing is selected and mat printing and gloss printing are performed as separate jobs, and an image in which regions having different values of surface roughness are disposed in the same plane of a formed object within a single job cannot be formed.

By contrast, as described above, according to the present embodiment, by setting the light amount of an ultraviolet ray to be emitted for each irradiation region of the irradiation device 22 based on surface roughness information, it is possible to properly control surface roughness for each region that can be irradiated with the ultraviolet ray by the irradiation device 22 in the same plane of a three-dimensional formed object with a simpler configuration.

The present embodiment uses an ink having surface roughness that can be controlled by the light amount of an ultraviolet ray to be emitted, and the irradiation device 22 having a light amount of an ultraviolet ray that can be controlled while keeping time from discharge of an ink droplet and an additional droplet to curing thereof. Therefore, it is possible to form a three-dimensional formed object in which regions of different values of surface roughness (for example, a mat region and a glossy region) are disposed in the same plane within a single job without changing the configuration of a system, such as arrangement of the head 18 and the irradiation device 22.

It is to be noted that, in the present embodiment, the main control unit 13 (data acquisition unit 12A) of the image processing apparatus 12 acquires the image data and the surface roughness information, but the present disclosure is not limited thereto. The surface roughness information may be created from the image data.

It is to be noted that the present embodiment has been described in such a manner that spread of the second layer droplet in a wet state depends on the curing state of the first layer droplet according to the irradiation light amount of an ultraviolet ray by the irradiation device 22, but the present disclosure is not limited thereto depending on the property of an ink. For example, in a case where the irradiation light amount of an ultraviolet ray by the irradiation device 22 is small, it is conceivable that spread of the first layer droplet in a wet state on the support P may be wider than in a case where the irradiation light amount of the ultraviolet ray by the irradiation device 22 is large depending on the property of an ink.

When a three-dimensional formed object (protrusion) is formed by lamination printing, by extracting only a boundary portion in a region having large surface roughness and overwriting a region having small surface roughness thereon, an inclined plane of the three-dimensional formed object (protrusion) may be made smooth.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A liquid discharge apparatus, comprising:
    a liquid discharge device configured to discharge a liquid onto a first layer of a formed object on a recording medium, the liquid having a curing degree variable by an amount of stimulation;
    an irradiation device configured to cure the liquid discharged onto the recording media by the stimulation, so as to form a second layer of the formed object; and
    control circuitry configured to
        acquire surface roughness information indicating glossiness of the first layer of the formed object;
        set a stimulation amount for the liquid based on the acquired surface roughness information; and
        cause the irradiation device to cure the liquid discharged by the liquid discharge device based on the set stimulation amount.

2. The liquid discharge apparatus according to claim 1, wherein the curing degree of the liquid is variable by an irradiation light amount of an ultraviolet ray, and wherein the irradiation device is further configured to irradiate the liquid discharged by the liquid discharge device with an ultraviolet ray to cure the liquid.

3. The liquid discharge apparatus according to claim 2, wherein the liquid discharged by the liquid discharge device has a hardness that increases as the irradiation light amount of the ultraviolet ray increases.

4. The liquid discharge apparatus according to claim 1, wherein the control circuitry is further configured to generate the surface roughness information from image data.

5. A liquid discharge method, comprising:
    discharging a liquid onto a first layer of a formed object on a recording medium, the liquid having a curing degree variable by an amount of stimulation, to form a second layer of the formed object;
    acquiring surface roughness information indicating glossiness of the first layer of the formed object formed on the recording medium;
    setting a stimulation amount for the liquid based on the acquired surface roughness information; and
    curing the discharged liquid based on the set stimulation amount.

6. The liquid discharge method according to claim 5, wherein the curing degree of the liquid is variable by an irradiation light amount of an ultraviolet ray, and wherein the curing step is performed with the ultraviolet ray.

7. The liquid discharge method according to claim 6, wherein the discharged liquid has a hardness that increases as the irradiation light amount of the ultraviolet ray increases.

8. The liquid discharge method according to claim 5, wherein the acquiring step further comprises generating the surface roughness information from image data.

9. The liquid discharge method of claim 5, wherein the setting step further comprises setting the stimulation amount for the liquid, the stimulation amount being an irradiation light amount.

* * * * *